M. F. MANGELSDORFF.
PROCESS OF AND APPARATUS FOR PREPARING POTATOES FOR DEHYDRATION.
APPLICATION FILED DEC. 14, 1917.
1,299,493.
Patented Apr. 8, 1919.
2 SHEETS—SHEET 1.
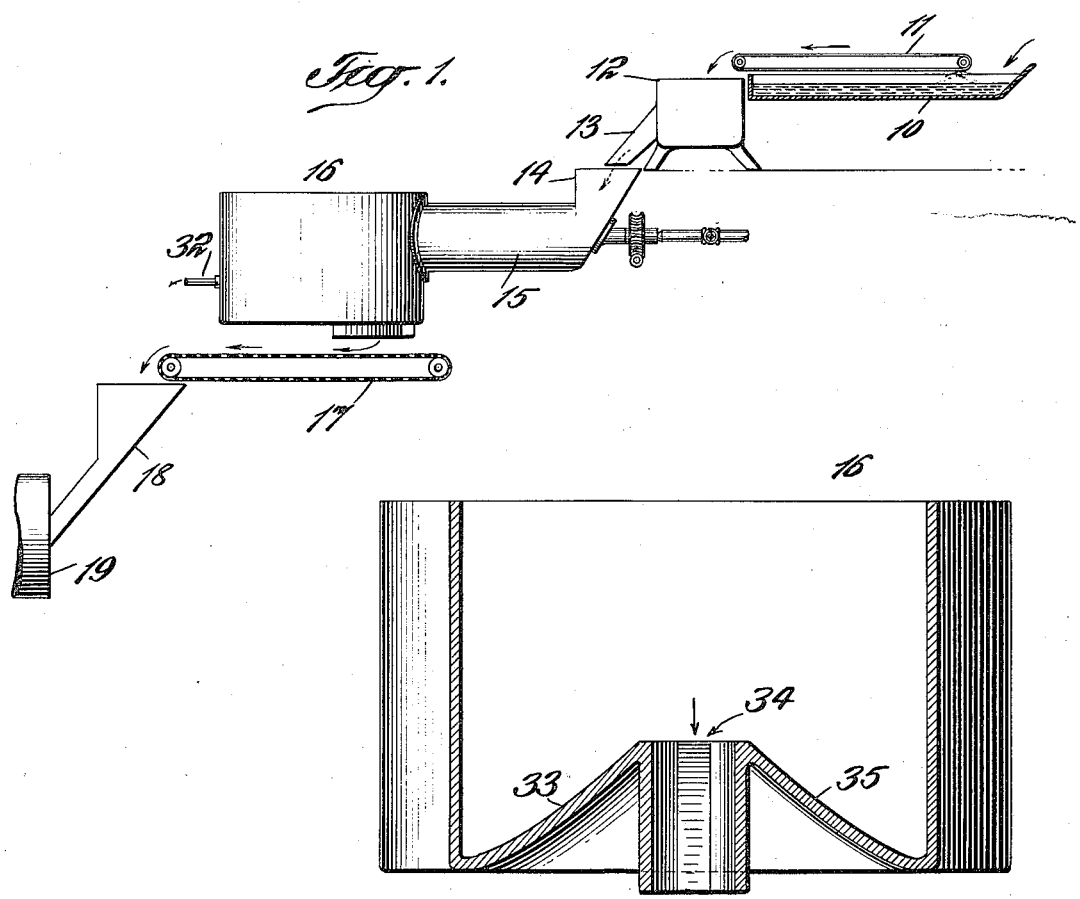
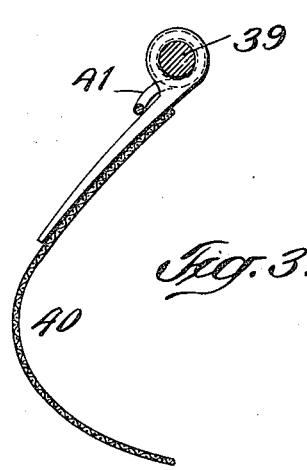
Inventor:
Max F. Mangelsdorff,
By his Attorney,
Charles C. Gill.

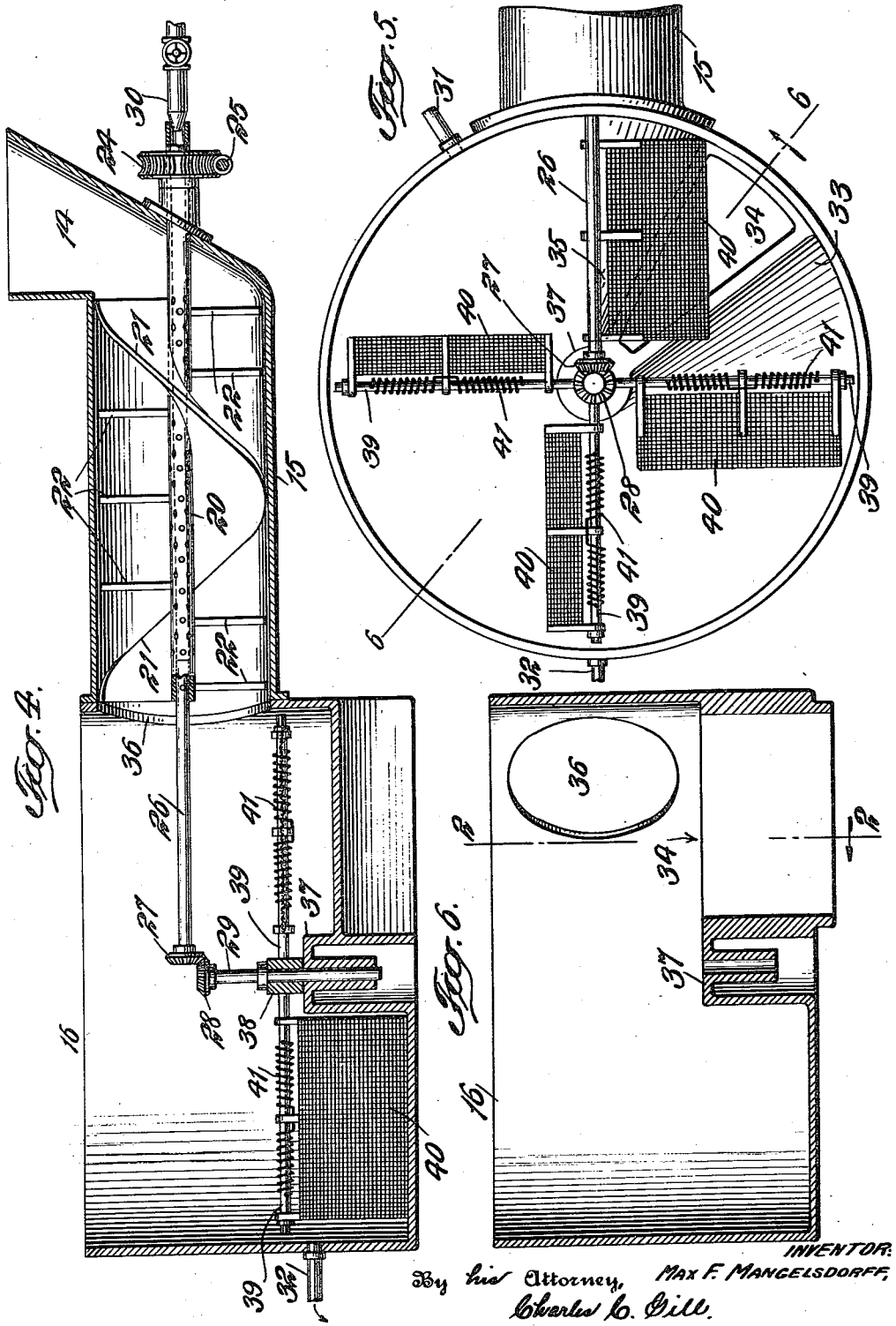

UNITED STATES PATENT OFFICE.

MAX F. MANGELSDORFF, OF UNION HILL, NEW JERSEY, ASSIGNOR TO HARRY BENTZ, OF MONTCLAIR, NEW JERSEY.

PROCESS OF AND APPARATUS FOR PREPARING POTATOES FOR DEHYDRATION.

1,299,493.  Specification of Letters Patent.  Patented Apr. 8, 1919.

Application filed December 14, 1917. Serial No. 207,037.

*To all whom it may concern:*

Be it known that I, MAX F. MANGELSDORFF, a citizen of the United States, and a resident of Union Hill, in the county of Hudson and State of New Jersey, have invented certain new and useful Improvements in Processes of and Apparatus for Preparing Potatoes for Dehydration, of which the following is a specification.

The invention pertains to the dehydration of vegetables, and it resides more particularly in a novel process and apparatus for the treatment of potatoes, or other vegetables of like character, preparatory to the delivery of the pieces of the same into the chamber of a dehydrating apparatus. The dehydrating apparatus may be of varied construction, but I will preferably make use of the dehydrating process and apparatus disclosed in my pending application for Letters Patent filed November 15, 1917, No. 202,187. Various vegetables, reduced to cossettes, cubes, slices and shreds, have been successfully dehydrated in such manner that when water is restored to the vegetables, they resume their natural characteristics and are substantially equivalent to fresh vegetables. A great deal of difficulty has been experienced in attempts to successfully effect the dehydration of potatoes, particularly white potatoes, and this has been due to the constitutional characteristics of the potato. A white potato, when peeled, rapidly becomes discolored, if not placed in water, but more particularly potatoes reduced to slices, cubes, cossettes and the like resist dehydration owing to the starchy character of the material, this starchy characteristic of the potato resulting in the pieces matting or sticking together in such manner that effective dehydration of the same in any practical sense has heretofore been impossible.

The object of my invention is to afford a process and apparatus whereby sliced or cut up potatoes may be successfully dehydrated, and in carrying out my invention I so treat the pieces of potato, such as cubes, cossettes, slices and the like, that said pieces are deprived of the surface starchy characteristics which have heretofore prevented their successful dehydration, the pieces of potato treated in accordance with my invention not matting or sticking together during the dehydration process and finally leaving the dehydrating apparatus with the pieces independent of one another and capable of being as readily handled as other dehydrated products. My invention also assures the proper color in the finished product and in the product being capable of being restored to its fresh condition by the return thereto of the requisite quantity of water, which will be taken up thereby.

In the practice of my invention the potatoes are peeled and placed in a trough or vessel containing clean water, and which trough is in near relation to a conveying belt. Employees take the potatoes from the trough and eye them and place them in said belt, and the potatoes are thereby transported and emptied into a vegetable cutting machine which reduces them to the character of pieces desired, as cubes, cossettes, slices and the like, and the pieces of the potatoes are discharged from the cutter into a chamber through which they are conveyed and within which they are subjected to the action of steam for a limited period of time, the passage of the pieces of potato through the steam chamber being continuous. The pieces of potato leaving the steam chamber are discharged into a tank of water, which cools the pieces, and the pieces of potato are finally automatically discharged from the water-tank upon a conveyer which, while permitting the water to drip from the pieces, conveys the pieces to the dehydrating apparatus. The pieces of potatoes subjected to the steaming process and then to the action of the cold water become deprived of their tendency to stick or mat together when in the dehydrating apparatus, and the accomplishment of this important result was one of the purposes of my invention. The pieces of potato are not permitted to remain in the steam-chamber until entirely cooked, but they may be said to become partly cooked on their passage through said chamber. If it would require from twelve to fifteen minutes to actually cook the potatoes, with a steam pressure of about ten pounds, I would so time their travel through the steam-chamber that they would remain therein about four or five minutes; and in regard to the length of time the pieces of partly cooked potato remain in the water tank, I would suggest that with a constant flow of water into and from the tank, the pieces of potato may remain in the tank about four or five minutes. My process is a substantially continuous one from the time the potatoes are delivered into the vegetable cutter until they enter the dehydrating apparatus, there being no manual handling of the potatoes after they have been delivered to the cutter.

The invention will be fully understood from the detailed description hereinafter presented, reference being had to the accompanying drawings, in which:

Figure 1 is a side elevation, partly in section and partly broken away, of suitable apparatus for carrying my invention into effect;

Fig. 2 is a sectional view, on a larger scale, through the water-tank, taken on the dotted line 2—2 of Fig. 6;

Fig. 3 is a sectional view, through one of the scoops, by means of which the pieces of potato are removed from the water in the water tank and carried to the discharge from said tank, whence the pieces fall on the conveyer leading to the dehydrating apparatus;

Fig. 4 is a vertical longitudinal section through that portion of the apparatus embracing the steam chamber and water tank;

Fig. 5 is a top view of the water tank, and

Fig. 6 is a vertical section through the water tank, taken on the dotted line 6—6 of Fig. 5, the several scoops being omitted from Fig. 6.

In the drawings, Fig. 1 diagrammatically represents the entire apparatus, and therein 10 designates a trough or receptacle for containing water and into which the peeled potatoes are placed, 11 a conveyer belt upon which the potatoes, taken from the trough or receptacle 10 and eyed, are placed, 12 a vegetable cutter of any known type and designed to produce cossettes, cubes, slices or the like, as may be desired, and into which cutter the conveyer 11 discharges the potatoes placed thereon, 13 a discharge spout from the cutter 12 for the pieces of potato, 14 a hopper to receive the pieces of potato discharged from the cutter, 15 a cylindrical casing into which the hopper 14 leads and through which the pieces of potato are caused to travel, 16 a receptacle or tank containing cold water into which the pieces of potato, traveling through the casing 15, are discharged, 17 a perforated or open mesh wire conveyer belt which receives from the tank 16 the pieces of potato after the same have been cooled by the water in said tank, and 18 a hopper which receives the pieces of potato from the belt 17 and delivers the same into a suitable dehydrating apparatus 19, within which the final dehydrating of the pieces of potato takes place.

The trough or receptacle 10 has an open top and is wider than the belt 11 and therefore employees may sit at each side of the receptacle 10 and constantly taking the peeled potatoes from the water therein, eye the same and place them on the belt 11. The belt 11 is of ordinary character and conveys the eyed-potatoes to the cutting machine 12, which also is of the customary type employed in cutting vegetables into the various kinds of pieces required.

The cylindrical casing 15 contains a longitudinally disposed perforated steam pipe or hollow shaft 20, and affixed to this steam pipe is a spiral conveyer blade 21 and a series of stirrer rods or arms 22, the outer edges of said blade and the outer ends of said arms being in close proximity to the inner surfaces of the casing 15. The pipe 20 is equipped at one end with a worm-wheel 24 which will be driven by a worm 25 from any suitable source of power. At its other end the perforated pipe 20 is secured to a shaft 26 which extends into the tank or receptacle 16 and has upon its exposed end a gear-wheel 27 in mesh with a corresponding gear-wheel 28 on a vertical shaft 29.

The cylindrical receptacle 15 constitutes a steam-chamber, and the steam is supplied through a pipe 30 from any suitable source of supply to the perforated pipe 20, through which the steam discharges in numerous jets and reaches all portions of the pieces of potato traveling through said casing. The pipe 30 is tapered at its end which enters the outer end of the pipe 20, and hence the pipe 20 may be rotated through the worm 25 and wheel 24 without interfering with the passage of steam into said pipe 20. The steam connection may, however, be variously constructed in well known mechanical ways, and the invention is not limited to the detail of delivering steam to the pipe 20. During the rotation of the pipe 20, the blade 21 and stirrer arms 22 are caused to rotate and effect the turning over and over and travel of the pieces of potato through said casing 15, so that the pieces of potato in practically constant stream are fed into the tank or receptacle 16. The steam discharging from the perforated pipe 20 acts directly against the surfaces of the pieces of potato and serves to partly cook said pieces, care however being taken that the pieces of potato are not entirely cooked on their passage through the casing 15.

The receptacle or tank 16 is simply a cylindrical open top receptacle having an inlet for water at 31 and an overflow or outlet for water at 32, the intention being that the water shall flow constantly through the inlet 31 and out through the outlet 32, so that fresh water may be within the tank or receptacle 16 at all times. The tank or receptacle 16 has at its discharge side an upwardly inclined floor 33 leading to a vertical discharge 34, and a downwardly inclined floor 35 leading downwardly from said discharge 34, and the said downwardly inclined floor 35 is in line with the inlet opening 36 for the pieces of potato discharged by the conveying mechanism within the shell or casing 15, as shown in Fig. 5. At the center of the tank or receptacle 16 is formed a vertical bearing hub 37 which receives the lower end of the shaft 29, and on this shaft is provided a hub 38 which rests on the top of the hub 37 and has secured to it several radial arms 39 upon which are hung, in a hinged manner, perforated scoops 40, which are normally turned downwardly by springs 41 coiled on said arms and engaging said scoops. The lower edges of the scoops 40, one of which is shown in Fig. 3, scrape along the bottom of the tank or receptacle 16, and said scoops draw the pieces of potato along through the water and to the discharge 34 therefor. The scoops 40 are curved, as shown in Fig. 3, so as to gather up the pieces of potato, and said scoops are perforated or made of wire mesh, so that as they move along in the tank or receptacle 16, the water may pass through them. When the scoops 40 successively reach the upwardly inclined floor 33, they turn or yield sufficiently on the arms 39 to ride up said floor and deliver the pieces of potato held by them to the vertical discharge 34. The scoops 40 ride over the upper edges of said discharge 34 and then down the downwardly inclined floor section 35, gathering the pieces of potato as they move along and drawing the same through the water in the tank or receptacle 16, which water cools the pieces of potato. The shaft 29 and radial arms 39 receive their motion from the shaft 26 and gear-wheels 27, 28, and hence the scoops 40 are always in operation while the steam-pipe 20 is in motion within the casing 15.

The operation is, therefore, to place the eyed-potatoes on the belt 11, cut the same into the character of pieces desired by their delivery into the cutter 12, cause the cut pieces to travel through the casing 15 and partly cook the same while they are traveling through said casing, then cooling the partly cooked pieces of potato in the tank or receptacle 16, discharging the same upon the perforated belt or conveyer 17 and delivering the pieces into the dehydrating apparatus 19. The perforated or wire mesh belt 17 travels continuously and receives the cooled pieces of potato from the discharge 34 of the tank or receptacle 16, and during the travel of the belt 17 the water carried on said pieces of potato may drip therefrom to a sufficient extent to render it possible to deliver the pieces of potato to the dehydrating apparatus 19.

My invention renders it possible to successfully dehydrate pieces of potato, and while all of the steps of the process are advantageous, the more essential steps of the process relate to the partial cooking of the pieces of raw potato, and then the cooling of the same before their delivery into the dehydrating apparatus. In accordance with my process the raw potatoes are kept in proper color and condition by being primarily placed in the trough or receptacle 10 and allowed to remain there until the belt 11 is to deliver them to the cutting machine 12, by which the raw potatoes are reduced to pieces of the desired size and shape, and said pieces are before they become discolored delivered into the steam chamber 15 wherein, as hereinbefore explained, they are agitated, turned over and caused to travel toward the water-tank 16 in the presence of numerous jets of steam issuing from the pipe 20 and which jets are permitted to partly cook the pieces of potato. The cooling of the partly cooked pieces may be in the water-tank 16, which is the preferred method, but they may be cooled or allowed to cool in some different manner. The partial cooking of the pieces of potato and their cooling in the water-tank 16 results in it being possible for said pieces to be properly dehydrated in suitable dehydrating apparatus 19. My process is especially applicable to potatoes, because of the starchy characteristic of the potato and because, when the pieces of potato are prepared in accordance with my process, they do not stick or mat together and resist proper dehydration. The partial cooking of the potato, as distinguished from a thorough cooking of the same, is of importance, and the purposes of my invention would not be accomplished if the cut pieces of raw potato were thoroughly cooked before being delivered to the cooling-tank 16.

What I claim as my invention and desire to secure by Letters Patent, is:

1. The method of preparing potatoes for the dehydration of the same, which comprises reducing raw potatoes into pieces, partly cooking these pieces in the presence of steam, delivering the partly cooked pieces to a body of water and moving them through the same, and then removing the pieces from said body of water and allowing the water to drip from them.

2. The method of preparing potatoes for the dehydration of the same, which comprises reducing raw potatoes into pieces, agitating these pieces in the presence of steam until they have become partly cooked, and then subjecting the same to a water bath.

3. A method of preparing potatoes for the dehydration of the same, which comprises the reduction of raw potatoes into pieces and the discharge of these pieces as formed into a chamber, effecting the constant agitation of said pieces within and their travel through said chamber, delivering steam within said chamber for partly cooking the pieces of potato traveling therethrough, and delivering the partly cooked pieces leaving said chamber to a water-bath, whence they are removed after becoming cool.

4. Apparatus for preparing potatoes for dehydration, comprising a cooling tank for the partly cooked potatoes, said tank comprising a bottom portion adapted to hold relatively cold water, into which the potatoes are to be delivered, and having at one side a raised discharge for the pieces, in combination with means for moving the potatoes out of the water and to said discharge.

Signed at New York city, in the county of New York and State of New York, this 11th day of December A. D. 1917.

MAX F. MANGELSDORFF.

Witnesses:
ARTHUR MARION,
CHAS. C. GILL.